INVENTOR.
JOHN T. HAYWARD

Jan. 10, 1950

J. T. HAYWARD 2,494,092

APPARATUS FOR LOGGING WELLS IN
TERMS OF DRILLING RATES

Filed Aug. 29, 1944

INVENTOR.
JOHN T. HAYWARD

BY

ATTORNEY

Patented Jan. 10, 1950

2,494,092

UNITED STATES PATENT OFFICE 2,494,092

APPARATUS FOR LOGGING WELLS IN TERMS OF DRILLING RATES

John T. Hayward, Solomons, Md.

Application August 29, 1944, Serial No. 551,695

5 Claims. (Cl. 346—39)

This invention relates to the determination of the drilling rates during rotary drilling of wells such as oil or gas wells, and more particularly to apparatus for determining such drilling rates whereby the traversed earth formations may be logged in terms of their relative hardness as determined by the rate of advance therethrough of the rotary drilling tools.

The present application is a continuation in part of my prior co-pending application, Serial No. 333,485, filed May 6, 1940, now abandoned.

Logs of drilled wells are sought primarily for correlation purposes in order to thereby obtain maps of the outlines and contours of sub-surface formations. By obtaining the logs of several wells suitably located in a particular area, the relative elevations and positions of the various sub-surface formations throughout such area can be plotted or mapped from such information, and marker formations can be established to which the varying depth of oil or gas containing formations can be more or less directly related and so provide important information for the proper location and the drilling of wells to tap such oil or gas-containing formations.

Correlation of well logs, however obtained, consists generally in directly comparing the depths or sea-level elevations of sequences of sub-surface formations which have similar definitive characteristics, whether the characteristic employed for comparison be porosity, electrical resistivity, relative hardness, color, chemical composition, or the like. The characteristic of any single formation, unless possibly it be the presence of oil, gas or water therein, is of little value for correlation purposes, apart from a knowledge of the similar characteristics of the overlying or underlying formations, or both, because of the many sources of error which may arise in the technique for logging a single formation, or because of anomalous conditions, which can be explained or accounted for only by reference to the adjacent formations.

The greater the accuracy of the individual logs, of course, the more accurate will be the mapping resulting from the correlation of the logs. To this end, numerous methods have been devised for obtaining accurate logs. Such methods include electrical surveys of various types, coring and others, most of which involve substantial expense and delays in drilling and are subject to various errors and uncertainties. This has resulted in the search for more accurate logging methods which can be performed during the actual progress of the drilling without hinderance thereto, and without adding to the cost of drilling.

One method of logging during drilling, particularly during rotary drilling, which has been gaining in favor in very recent years, is that of logging the wells in terms of the relative hardness of the formations being traversed by the drill. This is done by measuring the rate at which the rotary drill passes through the successive formations and by plotting the rate of drilling against the depth of the well, a log of the traversed formations is obtained in terms of the drilling rate which, under ideal conditions, is a measure of the relative hardness of the formations.

Various methods and apparatus have heretofore been devised in an effort to obtain suitable hardness logs of the well during drilling by measuring the rate of progress of the drill through the traversed formations. However, such methods and apparatus are subject to numerous sources of errors and anomalies arising largely from conventional drilling practices and from the individual habits or actions of the drillers which render the resulting logs inaccurate, and consequently of more or less uncertain value for correlation purposes.

One of the principal sources of error in former methods arises from the apparent (but unreal) changes in drilling rate due to the natural elasticity of the conventional string of drilling tools, particularly when substantial depths have been attained, and this characteristic, in conventional drilling practice, leads to the practice that the drilling tools be fed into the top of the well in a plurality of intermittent steps. For example, we will consider a well being drilled at a depth of 5,000 feet by the rotary method. The drill string will consist of a joined tubular drill stem having the drill bit attached to its lower end. The overall length of this string of drilling tools will be approximately 5,000 feet, and will be suspended in the well from suitable feed mechanism under the control of so-called "weight indicators" so that the drilling string hangs in the well with the drill bit just touching the bottom thereof. Due to the great weight of the suspended drilling string, the tubular drill stem, because of its natural elasticity, will form an elastic connection between the feed mechanism at the top of the well and the bit at the bottom of the hole, and for this reason the downward progress of the bit does not correspond to the feed supplied at the top of the well, since, if the drill string is lowered, say, six inches at the top of the well, the result will be that the bit presses a little harder on the bottom of the well, and if it is lowered another six inches, the bit will press still harder. If, now, the string is rotated, a foot may be drilled without any further movement of the feed at the top of the well. In actual practice, for about ninety percent of the time the wells will be drilled in this manner. With the drill stem rotating the driller will feed in from one-half to six inches of pipe, particularly when drilling in relatively hard formations. He will then wait for what he considers to be a suitable period of time, and will then feed in another increment of the drill stem. At the bottom of the well, the bit will be advancing at an almost constant rate, but the advance—as measured at the feed mechanism at the top of the well—will appear as steps of a few inches drilled at very high speeds, interspersed by relatively long periods during which apparently no progress whatsoever has been made. Again, in drilling relatively soft formations, the actual operation is frequently as follows: The driller will allow the drill pipe to feed into the well at a fairly high rate—say 500 feet per hour—for three or four feet; and then will hold up for a short period while the pumps clear the bit. In such a case, although the actual formation may be uniformly soft, the log record, under this operating practice, will indicate layers of soft formations interspersed with very hard spots.

Another source of error arises also from the fact that the actual feed of the drilling string at the top of the well is frequently interfered with by operations around the rig and by the actions of the driller which are not related in any manner to the actual hardness of the formations being drilled. For instance, the driller will slow down the rate of rotation and hold up the feed for fifteen or thirty seconds in order to shout some instruction to some other member of the drilling crew and will then catch up the feed rate by feeding faster for an approximately similar interval of time. It is important that these interruptions and irregularities be not reproduced on the well log, since, of course, they are not significant of the hardness of the formations they purport to represent, and they would not correspond from well to well and would interfere with proper correlation.

A satisfactory method and apparatus for logging in terms of drilling rate must, therefore, smooth out the apparent (but unreal) changes in the drilling rate caused by the elasticity of the drilling string and by the normal method of feed employed in conventional rotary drilling practice; and in addition, must suppress, as far as possible, changes in rate of feed at the surface, such as are caused by operations around the rig which are not due to actual changes in the hardness of the traversed formations.

The method, in accordance with this invention, contemplates the steps of continuously averaging all of the rates of the plurality of the advancing movements made by the upper end of the drilling string during a drilling interval to thereby obtain an average rate of advancement of the drill for that interval, and plotting the resulting average rate on a chart being simultaneously driven in synchronism with the advancing movements of the upper end of the drilling string to measure the progressive advance of the drilling tool through the earth formations.

In order to suppress non-significant fluctuations in the rate of advance of the feed mechanism, which, as noted above, may be due to operations around the rig which are not in any way related to the actual changes in hardness of the formations being drilled, the method of this invention contemplates the additional step which comprises selecting for inclusion in the average rate, only those changes in rate of advance of the drill feed mechanism which are significant of actual changes in hardness of the traversed formations.

It is, therefore, a principal object of this invention to provide an improved apparatus for logging wells during rotary drilling in terms of the drilling rate.

An important object is the provision of an apparatus for averaging the drilling rate during a rotary drilling interval by averaging the rates of the several advancing movements of the drill feed mechanism during said drilling interval.

Other objects are the provision of apparatus for averaging the drilling rates during rotary drilling intervals by continuously averaging the rates of all of the advancing movements of the drill feed mechanism during said intervals; and for continuously recording the resulting average drilling rate on a record paper being simultaneously driven in synchronism with said advancing movements of the drill feed mechanism to thereby correlate the average drilling rate with the corresponding depth of the drill.

Other and more specific objects and advantages of this invention will become apparent from the following detailed description when read in conjunction with the accompanying drawings.

Figure 1:
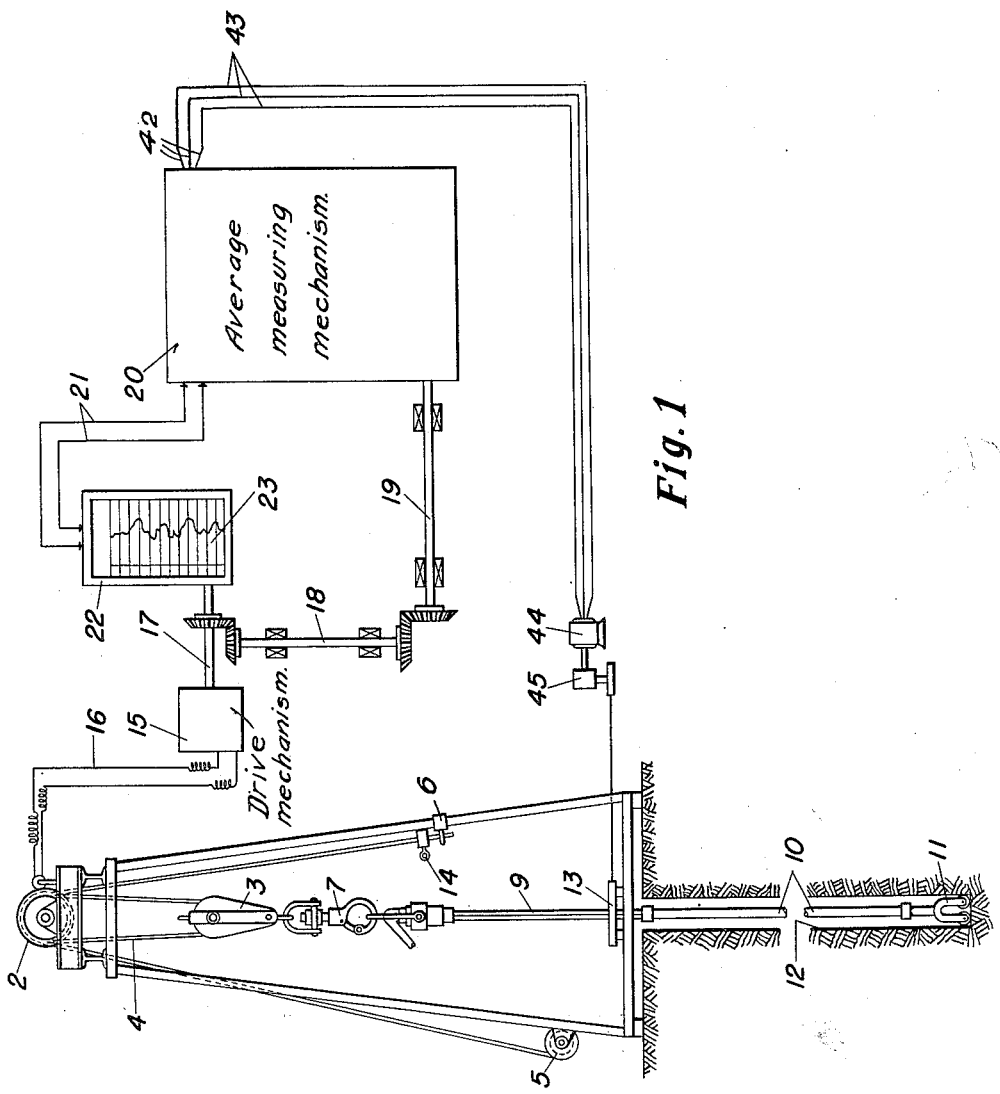
Fig. 1 shows a well drilling rig and the related assembly of apparatus designed in accordance with this invention for determining the drilling rate during drilling.

Referring to the drawings and to Fig. 1 in particular, a conventional rotary drilling rig is shown consisting of a derrick 1, crown block pulley 2, and a traveling block 3 suspended from pulley 2 by means of the cable 4, one end of which leads to the usual draw works 5 and the other, or "dead" end is attached to the derrick structure at 6. Suspended from the traveling block 3 is the usual drilling hook 7, from which, in turn, is suspended the usual string of drilling tools, consisting of a hose swivel 8, kelly 9, and drill pipe 10, to the lower end of which is attached the drill bit 11 which engages the earth formations in boring the well 12. The drilling string including the kelly 9 passes through the usual rotary table 13, driven by suitable means such as an engine (not shown), rotation of which is transmitted through the kelly to the drill pipe and bit to cause the bit to perform its required drilling operations. As the bit bores its way through the earth, the drilling string is fed into the well by lowering the traveling block through corresponding feed of the cable 4 from the draw works 5 over the crown block pulley 2.

For the purposes of this description the crown block pulley 2, traveling block 3, cable 4, draw works 5 and hook 7 will be termed, collectively, the "feed mechanism," while the swivel 8, kelly 9, drill pipe 10, and bit 11 will be collectively designated the "drilling string."

Due to the great weight of the drilling string, which if improperly regulated would bear too heavily on the bit 11, common rotary drilling practice requires that only as much of this weight should bear on the bit as is necessary to assure its steady progress through the earth formations. The excess weight is supported in the cable 4, which is, therefore, in tension which is communicated to the "dead" end of the cable at 6. The degree of tension of the cable furnishes a measure of the weight on the bit and by suitably attaching one of the conventional "weight indicators" adjacent the dead end of the cable, the weight on the bit can be registered and controlled at the draw works 5 in accordance with the reading on such a weight indicator, which in Fig. 1 is indicated symbolically by a gauge 14.

When the drilling string is thus suspended in the well, it will be in tension and will stretch appreciably under its own weight due to the natural elasticity of the metal of the drill stem. The drill bit 11 will be just touching the bottom of the well, when the weight thereon is suitably controlled, as indicated above.

Now, drilling is begun by rotating the rotary table 13 which, in turn, rotates the drill stem and bit, and the bit will advance at a substantially uniform rate under the weight applied thereto and the advance, for a short distance at least, will be absorbed in further stretching of the drill stem due to its elasticity and no additional feed may be required at the top of the well. This lengthening of the drill stem will be indicated by an increased weight indication on the weight indicator 14. To compensate for this increase in weight, the driller, in accordance with common practice, will feed in a compensating segment of the drill stem. This segment may be only a fraction of an inch long or several inches long, depending upon the hardness of the formation being drilled. The segment, however, will usually be fed at a comparatively high rate until the weight indication returns to normal. The natural elasticity of the drill stem will absorb all or a portion of the segment thus fed in, although the bit will continue advancing at substantially its same rate which is dependent, to some extent at least, on the rate of rotation of the drill stem, which is ordinarily substantially constant. As drilling continues, additional drill stem is fed into the well in a plurality of intermittent feeding operations in the manner described. As a result, any measurements of the rate of drilling responsive directly to the rate at which the drill stem is advanced into the top of the well, will produce a record showing a series of advances at high rates interspersed with periods of no advance and will thus give a record which, in terms of hardness of the formations, will show a series of relatively soft layers interspersed with very hard layers, even though the drill may have been advancing at a substantially uniform rate through a formation of uniform hardness. A record of the rate of feed will show corresponding fluctuations in the drilling rate and apparently, corresponding changes in the hardness of the formation, when in fact, no changes in the character of the formation have occurred.

It will be apparent, therefore, that any methods heretofore in use, by which the rates of the advancing movements of the feed mechanism were employed alone as a measure of the hardness of the formation drilled, would be entirely misleading whether plotted against the depth of the well or against time.

To overcome the above-described errors and difficulties inherent in the methods heretofore used, this invention contemplates averaging the rates of all of the advancing movements of the feed mechanism made during drilling which are significant of actual progress of the drill. By obtaining such an average, the resulting record will closely approximate the actual rate of advance of the drill bit and the record will provide an accurate measure of the relative hardness of the traversed formations.

The method steps by which such an average is obtained in accordance with this invention, and one embodiment of a suitable apparatus for performing these steps will now be described, reference being again had to the several drawings.

A drive mechanism, designated generally by the numeral 15, is suitably connected to the feed mechanism of the drilling rig by means of a connection 16 and rotates a shaft 17. Drive mechanism 15 may be of any suitable construction and may be connected to the feed mechanism in any suitable way whereby the rotations of shaft 17 may be synchronized with the advancing movements of the feed mechanism and the speed of rotation of the shaft 17 varies with the rate of such movements. Such a suitable drive mechanism is described in detail in my United States Patent 2,326,219, dated August 10, 1943. The rotations of shaft 17 are transmitted through any suitable transmission connections such as the gear-connected shafts 18 and 19 to a measuring mechanism, designated generally by the numeral 20, the details of which will be described hereinafter. Measuring mechanism 20 is adapted to show an average of the advancing movements of the feed mechanism to thereby produce an average of the corresponding drilling rates. The resulting average drilling rate produced in the measuring mechanism 20 may be recorded, as by transmitting it to the pen 35 of a conventional strip chart recorder 22 which traces the average on the record paper 23. By driving the record paper 23, having suitable footage markings thereon, from shaft 17, as indicated in the drawings, the record of the average drilling rate may be made to appear automatically on the paper in proper correlation with the corresponding well depths. It will be understood that the record of the average drilling rate, as obtained in accordance with this invention, may be plotted against time and a separate record of the well depths at the corresponding times may be made and the two records later correlated with each other in any suitable manner.

If the average drilling rate is thus plotted against time, as measured by a suitable clock, means are provided to stop the clock whenever the rotary is stopped, so as to avoid the false indication of hard spots such as would result should the clock keep on running while drilling is suspended.

Figure 2:
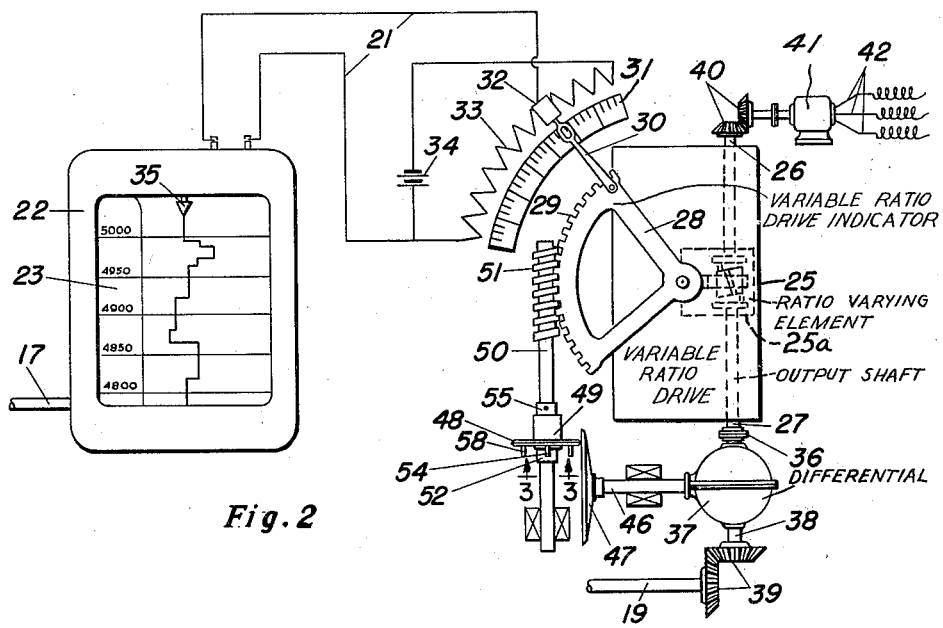
Fig. 2 is an enlarged view of the assembly of the rate determining and averaging apparatus in accordance with this invention.
Figure 4:
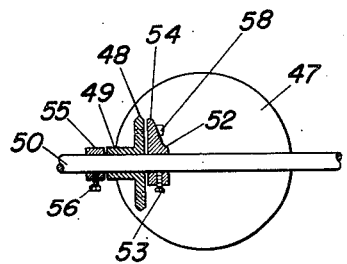
Fig. 4 is a sectional view taken along line 4—4 of Fig. 3.
Figure 3:
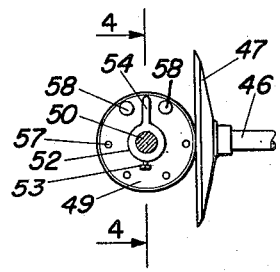
Fig. 3 is a detail of the rate determining apparatus viewed along line 3—3 of Fig. 2.

The measuring mechanism 20, by which the average drilling rate is obtained, is illustrated in greater detail in Figs. 2, 3 and 4, and comprises a friction drive type infinitely variable gear 25 of any suitable and well-known construction, such, for example, as the commercially available variable gear model 25, type 100062, manufactured by Briggs & Stratton Manufacturing Corp., Milwaukee, Wisconsin. The variable gear 25 has the conventional gear ratio varying element 25a schematically indicated in broken lines in Fig. 2, and is provided with the usual input shaft 26 and output shaft 27, and the usual gear ratio control lever 28, which is fitted at its outer end with a quadrant gear 29.

The ordinary functioning of a variable gear of this character is such that the relative speeds of the input and output shafts may be controlled by varying the gear ratio by suitable angular shifting of control lever 28. The change in angular position of lever 28 from its center, or normal position, will then provide a measure of the ratio of the speeds of the two shafts. A pointer 30 is suitably attached to the lever 28 and indicates on a scale 31 this ratio between the speeds of the shafts 26 and 27. If input shaft 26 is driven at some known speed and scale 31 calibrated accordingly, the indication on scale 31 can be made to read directly the corresponding speed of shaft 27.

Each change in speed of shaft 27 relative to shaft 26 involves a corresponding change in position of the control lever 28, and a chart of the corresponding changes in position of lever 28 will provide a record of the changes in speed of shaft 27.

As before stated, I provide a conventional recorder 22, having a recording pen 35. This pen might, if desired, be mechanically connected, as by suitable linkage, directly with pointer 30, for tracing on chart 23 the record of the speed of shaft 27 (and consequently, through mechanism hereinafter described, the speed of shaft 19).

Figure 5:
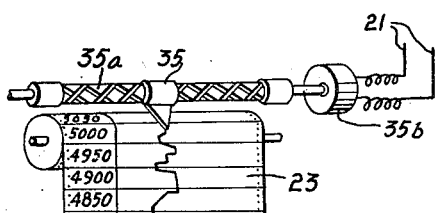
Fig. 5 is a detail in perspective of a portion of the recorder mechanism.

However, in the drawing, I have illustrated the recorder 22 as in the nature of a self-balancing recording potentiometer, such, for example, as the well-known type sold commercially by Leeds and Northrop, of Philadelphia, Pa., under the trade name "Micromax," as illustrated more or less schematically in Fig. 5 in which recorder pen 35 is shown as mounted on a reversing screw shaft 35a which is reversibly driven by a conventional potentiometer motor 35b in accordance with the voltage supplied through leads 21. As shown in Fig. 2, the pointer 30 carries a slide 32, movable over a high resistance 33, connected at its ends to a battery 34, thus constituting a conventional potentiometer. The slide 32 and one end of the resistance 33 are connected by leads 21 with the instrument 22. Varying voltages thus impressed on the instrument 22 by movement of the slide, operate, through suitable relays and a motor (not shown, but contained within the instrument), to cause the pen 35 to shift in response to such changes in voltage, and thus to follow the movements of the pointer 30.

Output shaft 27 is directly coupled to one of the side shafts 36 of a conventional differential 37, whose opposite side shaft 38 is driven by transmission shaft 19 through the bevel gears 39. The transmission shaft 19 is driven, as previously described, in synchronism with the advancing movements of the feed mechanism at the drilling rig, and means are provided, as hereinafter described, whereby output shaft 27 will be driven in synchronism with shaft 19, when the latter is running at a uniform rate.

Input shaft 26 is connected by means of bevel gears 40 to a motor 41, which is adapted to drive input shaft 26 at some suitable speed. Where the speed at which shaft 26 is driven is known, the measure of the angular shifting of control lever 28 will provide a measure of the speeed of shaft 27. By continuously recording the changes in position of lever 28, a continuous record of the speed of shaft 27 and therefore of synchronous shaft 19, can be made. Since shaft 19 is directly connected to shaft 17 and thence to the feed mechanism, this record, save for the averaging mechanism hereinafter described, would be a continuous record of the rate of the advancing movements of the feed mechanism.

Motor 41 may be a synchronous motor, such as an electric clock motor connected by leads 42 to the usual 60 cycle current, and would thus drive shaft 26 at a constant known speed, and the rate of the advancing movements of the feed mechanism as indicated by pointer 30 and recorded on record paper 23 would be a time-rate or speed. However motor 41 may be the driven motor of a conventional Selsyn transmission system, in which leads 42 are connected by leads 43, as shown in Fig. 1, to the driver motor or generator 44, which is, in turn, driven by the rotary table 13 through a suitable belt and drive connection 45. In this case shaft 26 would thus be driven in synchronism with the rotations of the rotary table and the rate of advance of the feed mechanism, as indicated by pointer 30 and recorded on record paper 23, would be a rate defined in terms of the rotations of the drill. Thus, where in the first example the rate of the movements of the feed mechanism would be recorded as feet per minute, for example, in the latter case, the rate of the advancing movements of the feed mechanism would be in inches or feet per thousand revolutions, or some similar quantity. In this manner the advance of the feed mechanism can be differentiated with respect to any rate defining quantity suitable for logging purposes.

It will be understood that by means of the mechanism heretofore described, the actual rate of the advancing movements of the feed mechanism will be directly transmitted to the rate measuring mechanism 20, which will in turn produce a record thereof on record paper 23 in the manner described.

To produce a measurement of the average drilling rate, additional operations must be performed and special means for controlling these operations provided. Such special means are embodied in the average rate measuring mechanism 20. In order to produce an average of these rates to thereby show an average of the drilling rate, the essential procedural step, in accordance with this invention, is to delay or retard the response of the rate measurements to any changes in the rate of the advancing movements of the feed mechanism. This delaying or retarding step produces a resulting measurement which is an average rate for these advancing movements of the feed mechanism. This retarding or averaging step may be accomplished manually or mechanically by controlling the rate at which the control lever 28 is shifted in response to the changes in rate of the advancing movements of the feed mechanism in such manner that this lever is moved relatively slowly. This control of the rate of shifting of lever 28 will, in turn, control the rate of response of the rate measuring or recording mechanism to changes in the rate of advance of the feed mechanism.

A mechanism, in accordance with this invention, whereby the slowing down or retarding step above referred to may be suitably accomplished, will now be described. Referring again to Fig. 2, particularly, differential 37 has a center shaft 46, on the outer end of which is mounted a smooth faced disk 47, the outer face of which makes frictional driving contact with the peripheral edge 48 of a disk 49, which is positioned at right angles to the face of disk 47 and is mounted on a shaft 50, one end of which carries a worm 51 which engages the teeth of quadrant gear 29 carried by control lever 28. The disk 49 might well be keyed to shaft 50, to rotate therewith, and this would achieve the main purpose of the invention. As shown, however, this disk is arranged to have a limited angular movement with respect to shaft 50. To this end, the disk is rotatably mounted on the shaft, and a collar 52 is disposed on the shaft adjacent one face of disk 49 and is fixed against rotation on said shaft by means of a set screw 53 (Figs. 2, 3 and 4). A lug 54 extends radially from collar 52 along the adjacent face of disk 49. A second collar 55 is fixedly mounted on shaft 50 by means of a set screw 56 on the opposite side of disk 49. Collars 52 and 55 serve to prevent longitudinal movements of the disk 49 on shaft 50. The face of disk 49 adjacent collar 52 is provided with a plurality of angularly spaced holes 57 arranged concentrically thereon with respect to the hub of the disk. A pair of pins 58—58 are positioned in selected ones of the holes 57 on opposite sides of lug 54 whereby the free rotation of disk 49 on shaft 50 is limited to the angular distance between the pins 58—58, by the engagement of these pins with said lug.

Disks 47 and 49 cooperate to function as a variable gear. Rotation of disk 47 drives disk 49 through the frictional contact of the peripheral edge 48 on the face of disk 47, and the rotary speed of disk 49 relative to that of disk 47 will depend upon the radial distance from the center of disk 47 at which disk 49 contacts the face thereof. When the disks 47 and 49 are of equal diameters, the farther the point of contact of the disks from the center of disk 47, the more closely matched will be the relative speeds. Theoretically, when the peripheral edges of the two disks are in contact, the speeds will be the same and the gear ratio will be a one-to-one ratio. The nearer the point of contact is to the center of disk 47, the slower will be the speed of disk 49 relative to that of disk 47 until, theoretically, when the point of contact is the exact center of disk 47, no rotation of disk 49 will occur. Thus, the radial distance of the point of contact of the disks from the center of disk 47 will be a measure of the gear ratio, that is, of the relative speeds of disks 47 and 49 and of their respective shafts 46 and 50. Where the diameters of disks 47 and 49 are different their relative speeds will be varied additionally in a fixed ratio dependent upon the ratio of the diameters. Rotation of disk 49, when lug 54 has contacted one of the pins 58, rotates shaft 50, which, in turn, acts through the engagement of worm 51 with the teeth of quadrant gear 29 to shift control lever 28 at a rate corresponding to the rate of rotation of disk 49. The rate at which angular shifting of control lever 28 takes place by this means is governed by changing the point of engagement of disk 49 with disk 47, and may vary from a very slow rate, if the point of contact of disks 47 and 49 is adjusted to near the center of disk 47, to a relatively high rate if the point of contact is adjusted to near the peripheral edge of disk 47. When the point of contact of disks 47 and 49 is adjusted to near the center of disk 47, these disks constitute reduction gearing, and the worm drive 51 constitutes additional reduction gearing, serving to further retard or slow down the rate at which the control lever 28 is shifted.

This mechanism for controlling the rate of shifting of control lever 28 operates in the following manner: Assuming that the lever 28 has been set in such position that the speed of shafts 27 and 36 is equal to that of the shafts 38 and 19, and that the feed mechanism of the drilling rig is advancing at a uniform rate, so that the shaft 19 is turning at a uniform rate, the mechanism will be in a state of equilibrium, and shaft 46 will be at rest. Suppose now the rate of advance of the feed mechanism changes. The speed of shaft 19 and, consequently, of shaft 38 of the differential will change correspondingly and shaft 38, will therefore, be running at a speed different than that of shaft 36. This difference in speed between shafts 36 and 38 of the differential will necessarily cause center shaft 46 of the differential to rotate, causing disk 47 to rotate and frictionally drive disk 49, which, upon absorption of the lost motion between lug 54 and one of the pins 58, will in turn rotate shaft 50. Rotation of shaft 50 operates through co-action of worm 51 with the teeth of quadrant gear 29, to slowly shift control lever 28, thereby changing the gear ratio of variable gear 25, until the system is again brought into equilibrium by bringing shaft 36 to the new speed of shaft 38, whereupon further rotation of shaft 46 and corresponding movement of control lever 28 ceases. Thus the arrangement described is in the nature of a follow-up mechanism. Although the arm 28 begins to move as soon as any variation in the speed of shaft 19 occurs, it moves very slowly, and a substantial time interval is required for it to travel far enough to restore the mechanism to equilibrium. If, during such slow movement of the arm 28, the speed of shaft 19 should change again, this time in the opposite sense, the movement of the arm would be reversed, and it would never reach the position toward which it had originally begun to travel, or, in other words, the position corresponding to the first change in speed of the shaft 19. Thus, unless any speed change of shaft 19 persists for a sufficient length of time, the arm 28 will not be displaced to the maximum extent which such speed change would eventually produce, but will stop short of such maximum displacement. Hence, the movements of the arm 28, although in phase with changes of speed of the shaft 19, will not completely follow such changes, if the latter are of only brief duration. Accordingly, insignificant brief changes in speed have little or no effect on the position of the recording pen 35.

By predetermined setting of disk 49 along shaft 50, a suitable point of contact on disk 47 may be preselected to determine the degree of retarding and the rate at which control lever 28 is shifted to make the necessary correction for the changes in the rates of advance of the feed mechanism. Thus, the closer the point of contact to the periphery of disk 47, the more rapid will be the response of control lever 28 to the changes in the rate of advance of the feed mechanism, and the closer the point of contact to the center of disk 47, the slower will be the response of control lever 28 to the changes in the rate of advance of the feed mechanism. The slower the response of the control lever, the smoother and less jagged will be the curve traced on the chart 23. Instead of exhibiting sharp and sudden variations of relatively short duration, the record will show a succession of "humps," of relatively long duration, on one side or the other of the center line, each "hump" indicating the average value of the group of short, sharp variations occuring in the corresponding interval. By thus automatically "smoothing out" the changes in the rates of the advancing movements of the feed mechanism, the resulting record, as produced on record paper 23, will, as above stated, thereupon become an average of the drilling rate, that is, of the rate of advance of the drill bit through the traversed formations. The resulting record thus produced on record paper 23 will represent substantially accurately the actual changes in hardness of the formation without reflecting the apparent changes resulting from the conventional practice of intermittent feeding of the drilling string into the well.

The floating arrangement of disk 49 on shaft 50 provides a degree of lost motion depending upon the positioning of pins 58—58 relative to lug 54, and is provided in order to further smooth out the measurements of the drilling rate by eliminating or suppressing from the record those momentary changes in rate of feed of the drill stem which are described above as due largely to the individual actions of the driller and to operations around the rig which are in no way related to the actual hardness of the formation being drilled.

When a change occurs in the rate of the advancing movements of the drill feed mechanism, disk 47 begins rotation as above described, and begins to drive disk 49. Since the latter floats on shaft 50, no rotation of shaft 50 and, therefore, no movement of control lever 28, will occur until lug 54 has engaged one or the other of the pins 58 depending upon the direction of rotation of disk 47. By selection of suitable angular spacing of pins 58 no rotation of shaft 50 can occur until the change in rate of the advancing movements of the feed mechanism has continued for a period of sufficient duration to cause disk 47 to rotate disk 49 through an angular distance sufficient to bring lug 54 into engagement with one of the pins 58. The spacing of pins 58 will ordinarily be such as to provide a time interval sufficiently great to absorb those momentary interruptions or variations in the rate of feed of the drilling string which are non-significant of any changes in the hardness of the formations being drilled, for example thirty seconds, and these momentary variations will thus be suppressed from the record of the drilling rate as finally transmitted to record paper 23. This lost-motion mechanism, therefore, provides means for selecting those changes in the rates of the advancing movements of the feed mechanism which are to be subjected to the averaging step of this invention, namely, those which endure beyond a predetermined minium time interval, and therefore, limits the averaging to only those changes in rate of advance of the feed mechanism which, when averaged as described, are significant of actual changes in the rate of drilling.

It will be seen from the foregoing description that the measuring mechanism 20 includes a variable speed device (variable gear 25 and known speed source 41) which operates to automatically match the speed of drilling as transmitted thereto from the advancing movements of the feed mechanism. The changes in speed of the variable speed device from a known speed to the matching speed provides a measure of the rate of the advancing movements of the feed mechanism. The control mechanism extending between shaft 46 of differential 37 and gear ratio control lever 28 provides means for controllably retarding the matching response of the variable speed device to changes in the rates of the advancing movements of the feed mechanism, and the measure of the retarded variation in speed of the variable speed device constitutes an average of the drilling speeds.

A concise way of describing the function of the apparatus is to say that it operates to take successive increments of the feed during a given drilling interval, to integrate those increments, and to differentiate the integrated value with respect to a rate determining factor such as time, or number of revolutions of the rotary.

It will be understood that modifications and alterations may be made in the arrangement and form of the apparatus elements of this invention without departing from the scope of the appended claims.

What I claim is:

1. In the system of rotary drilling of a well employing a rotating drilling string having a drilling tool attached to the lower end thereof and a feed mechanism attached to the upper end thereof for advancing said drilling tool through earth formations by a plurality of intermittent advancing movements at varying rates, apparatus for logging the well in terms of the average drilling rate, comprising, a variable ratio gear device having an input and an output shaft, a rate-determining speed source connected to said input shaft and responsive to the rotations of the drilling string, a differential member having one side shaft connected to said output shaft, a second side shaft connected to said feed mechanism to be driven thereby in synchronism with the rates of the advancing movements of said feed mechanism, and a third shaft rotatable in response to differences in speeds of said side shafts, a control member for said variable ratio gear device for changing the gear ratio between said input and output shafts, a drive connection including reduction gearing between said third shaft and said control member, and means associated with said control member for measuring the changes in gear ratio of said variable ratio gear device as an index of the average drilling rate.

2. In the system of rotary drilling of a well employing a rotating drilling string having a drilling tool attached to the lower end thereof and a feed mechanism attached to the upper end thereof for advancing said drilling tool through earth formations by a plurality of intermittent advancing movements at varying rates, apparatus for logging the well in terms of the average drilling rate, comprising, a variable ratio gear device having an input and an output shaft, a rate-determining speed source connected to said input shaft and responsive to the rotations of the drilling string, a differential member having one side shaft connected to said output shaft, a second side shaft connected to said feed mechanism to be driven thereby in synchronism with the rates of the advancing movements of said feed mechanism, and a third shaft rotatable in response to differences in speeds of said side shafts, a control member for said variable ratio gear device for changing the gear ratio between said input and output shafts, a drive connection including reduction gearing between said third shaft and said control member, a lost-motion mechanism in said drive connection adapted to prevent actuation of said control member by oscillations of said third shaft which are of a predetermined limited duration, and means associated with said control member for measuring the changes in gear ratio of said variable ratio gear device as an index of the average drilling rate.

3. In the system of rotary drilling of a well employing a rotating drilling string having a drilling tool attached to the lower end thereof and a feed mechanism attached to the upper end thereof for advancing said drilling tool through earth formations by a plurality of intermittent advancing movements at varying rates, apparatus for logging the well in terms of the average drilling rate, comprising, a variable ratio gear device having an input and an output shaft, a drive connection for rotating said input shaft from the rotations of said drilling string, a differential member having one side shaft connected to said output shaft, a second side shaft connected to said feed mechanism to be driven thereby in synchronism with the rates of the advancing movements of said feed mechanism, and a third shaft rotatable in response to differences in speeds of said side shafts, a control member for said variable ratio gear device for changing the gear ratio between said input and output shafts, a drive connection including variable reduction gearing between said third shaft and said control member, a record chart driven by said feed mechanism in synchronism with the progressive advance of said drilling tool, and a marking member driven by said control member for marking on said chart the changes in gear ratio of said variable ratio gear device as an index of the average drilling rate.

4. In the system of rotary drilling of a well employing a rotating drilling string having a drilling tool attached to the lower end thereof and a feed mechanism attached to the upper end thereof for advancing said drilling tool through earth formations by a plurality of intermittent advancing movements at varying rates, apparatus for logging the well in terms of the average drilling rate, comprising, a record-receiving means driven by said feed mechanism in synchronism with the progressive advance of said drilling tool, an averaging device having means responsive to said drill feeding movements and to the related rotational movements of said drilling string to thereby continuously produce an output corresponding to an average of the rates of said drill feeding movements over successive drilling intervals, and means for recording said output on said record-receiving means.

5. In the system of rotary drilling of a well employing a rotating drilling string having a drilling tool attached to the lower end thereof and a feed mechanism attached to the upper end thereof for advancing said drilling tool through earth formations by a plurality of intermittent advancing movements at varying rates, apparatus for logging the well in terms of the average drilling rate, comprising, a record chart supporting means operated by said feed mechanism to move in synchronism with the progressive advance of said drilling tool, a rate-defining source responsive to rotations of the drilling string, an averaging device responsive to said drill feeding movements and to the movements of said rate-defining source to continuously produce an average of the rates of said drill feeding movements over successive drilling intervals, and marking means adjacent a chart carried by said chart supporting means and movable relative thereto by said averaging device for recording said average of the drilling rates on said chart.

JOHN T. HAYWARD.

REFERENCES CITED

The following references are of record in the file of this patent:

UNITED STATES PATENTS

| Number | Name | Date |
| --- | --- | --- |
| Re. 21,297 | Mizell | Dec. 12, 1939 |
| 2,230,280 | Yeatman | Feb. 4, 1941 |
| 2,365,014 | Silverman et al. | Dec. 12, 1944 |

FOREIGN PATENTS

| Number | Country | Date |
| --- | --- | --- |
| 131,972 | Germany | June 19, 1902 |
| 125,831 | Austria | Dec. 10, 1931 |

OTHER REFERENCES

The Oil and Gas Journal, July 1, 1937, pages 36, 37—article by Maddox; ibid., March 31, 1938, pages 69–71—article by David; ibid., July 13, 1939, pages 55, 58—article by Hiestand.

Dedication

2,494,092.—*John T. Hayward*, Solomons, Md. APPARATUS FOR LOGGING WELLS IN TERMS OF DRILLING RATES. Patent dated Jan. 10, 1950. Dedication filed Dec. 9, 1954, by the inventor; the *Hayward-Wolff Research Corporation*, the exclusive licensee, consenting.

Hereby dedicates, irrevocably and without limitation, said Letters Patent for the entire remainder of its term to the People of the United States of America.

[*Official Gazette January 4, 1955.*]